2,946,800
PROCESS FOR THE PREPARATION OF ISONICOTINIC ACID

Ellis K. Fields, Chicago, Ill., assignor to Standard Oil Company, Chicago, Ill., a corporation of Indiana No Drawing. Filed June 5, 1957, Ser. No. 663,599

7 Claims. (Cl. 260—295)

This invention relates to an improved process for the preparation of isonicotinic acid.

In the past, isonicotinic acid has been obtained by the oxidation of gamma picoline with chemical oxidants such as aqueous solutions of potassium permanganate, strongly acidic oxidizing agents such as nitric acid or mixtures of nitric and sulfuric acid or by procedures involving the conversion of the picoline to a salt of an inorganic acid and oxidation thereof with oxidizing agents such as chlorine.

Recently there has been proposed a process for the preparation of isonicotinic acid which involves the conversion of gamma picoline by reaction with formaldehyde into a methylolated derivative which has been found to be readily oxidized with strongly acidic chemical oxidizing agents such as nitric acid to the desired isonicotinic acid.

The oxidation processes such as those described consistently utilize chemical oxidants for the conversion of gamma picoline or its derivatives to isonicotinic acid and the art is singularly silent as to effective and economical methods for the direct oxidation of these compounds by means of air or oxygen containing gases.

In my co-pending application Serial No. 663,603, filed June 5, 1957, filed concurrently herewith, I have disclosed a process for the oxidation of gamma picoline with air in the presence of metallic oxidation catalysts, at temperatures above 450° F. to obtain isonicotinic acid. As more fully described therein, this process has the advantage of using air as an oxidant to obtain high yields of pure product, thus avoiding the relatively costly chemical oxidizing agents which have been utilized in the past and at the same time avoiding contamination of the desired isonicotinic acid product with by-products such as nitrated materials which invariably accompany the products of nitric acid oxidation processes.

According to the present invention, gamma picoline is first converted by reaction with formaldehyde to a methylolated derivative and this derivative is then subjected to air oxidation in the presence of a metallic oxidation catalyst and preferably in the presence of a solvent comprising a lower carboxylic acid to give substantial yields of pure isonicotinic acid. I have discovered that the oxidation of the methylolated derivative of gamma picoline can be conducted at temperatures appreciably lower than those required for the oxidation of gamma picoline itself, thus reducing the possibility of non-selective oxidation of the feedstock to carbon dioxide and water as well as intermediate products of oxidation.

In the practice of my invention, gamma picoline is condensed with formaldehyde or with a material reacting as formaldehyde, such as solid paraformaldehyde, trioxymethylene, and the like. Aqueous or alcoholic solutions of formaldehyde may be employed. The crude material which results from the condensation of one mole of formaldehyde with one mole of gamma picoline comprises primarily 4-(beta-hydroxy ethyl) pyridine, but is almost always contaminated with small amounts of products having two or three methylol groups attached to the 4-methyl group of the gamma picoline. However for my process it is unnecessary to purify the mono-methylol derivative, the compounds having additional methylol groups being concurrently oxidized to isonicotine acid.

The formaldehyde condensation product of gamma picoline may be obtained by reaction of pure gamma picoline with formaldehyde or may be obtained by reaction of formaldehyde with a mixture of isomeric picolines containing gamma picoline as one constituent thereof. Where the condensation product is prepared in the presence of other isomeric picolines, the methylolated gamma picoline may be separated from the unmethylolated pyridine bases, or the entire mixture may be utilized as the feed to the oxidation reaction, in which case only the formaldehyde condensation product is oxidized to the corresponding pyridine carboxylic acid under the conditions of temperature and pressure employed in the present process.

In accordance with the process of the invention, 4-(beta-hydroxy ethyl) pyridine or mixtures thereof with polymethylolated derivatives of gamma picoline is contacted with molecular oxygen in the liquid phase in the presence of a metallic oxidation catalyst and preferably in a solvent comprising an oxidation-resistant monocarboxylic acid having from 2 to 8 carbon atoms at a temperature of about 350° F. to 425° F. and at a pressure at least sufficient to maintain liquid phase reaction conditions for a period of time sufficient to obtain substantial conversion of the pyridine starting material to isonicotinic acid.

The oxidation is desirably conducted in the presence of a solvent medium which is preferably a mono-carboxylic acid. The acid should be one which is liquid at the reaction temperature. The aliphatic saturated monocarboxylic acids having from 2 to 8 carbon atoms in the molecule and free of hydrogen atoms attached to tertiary carbon atoms are particularly advantageous as solvents since they have been found to be relatively stable or inert to oxidation in the reaction system.

The preferred solvent is acetic acid, usually employed in its glacial form. Although acetic acid is preferred, higher homologs such as propionic acid, butyric acid, etc. may be employed. Benzoic acid may be used. Mixtures of these acids may be used.

Those skilled in the art will appreciate that the volume of solvent employed should be adjusted so that the intermediate products of oxidation as well as unconverted pyridine compounds will be held in solution during the oxidation reaction, and so that the pyridine carboxylic acid product, which may be insoluble or partially insoluble in said solvent, may be readily recovered, for example by filtration from the oxidized reaction product. The volume of solvent utilized is not critical but typically will be in the range of from 0.5 to 10 times the weight of oxidizable starting material. Where the product is recovered by filtration from the reaction mixture it may be contaminated by intermediates if the amount of solvent is too small. If the amount is too large the process is uneconomical.

The process of the invention is carried out in the presence of an oxidation catalyst, and for this purpose any of the known metallic oxidation catalysts may be employed. Suitable oxidation catalysts comprise in general, metals having an atomic weight of from about 50 to about 200 and more particularly compounds of the heavy metals. The metallic oxidation catalysts may be in the form of the elemental metal or may be introduced as the oxide or hydroxide of the metal but preferably comprises a salt which is soluble or partially soluble in the reaction mixture. Heavy metals, suitable compounds of which may be employed as the catalyst include, for example manganese, bismuth, cobalt, lead, copper, vanadium, tin, chromium, molybdenum, cerium, etc. Mixtures of metals may be employed. Cobalt and manganese are particularly effective as oxidation catalysts. Illustrative examples of particular compounds of heavy metals which may be employed include, for example the salts of saturated or unsaturated carboxylic acids such as cobalt acetate, manganese acetate, cobalt butyrate, manganese linoleate and the like; salts of alicyclic organic acids such as cobalt naphthenate, manganese naphthenate and the like; salts of aromatic carboxylic acids such as manganese benzoate, manganese toluate and the like, etc.

The amount of the catalyst present in the reaction mixture may be varied over wide limits. As little as 0.001% by the weight of the catalyst based on the pyridine compound undergoing oxidation may be employed and as much as 5% by weight of the catalyst may be used. The amount of the catalyst is preferably between 0.01% and about 2% by weight of the oxidizable pyridine compound furnished to the process.

As the molecular oxygen-containing gas there may be employed substantially 100% oxygen gas or gaseous mixtures containing lower concentrations of oxygen. Such mixtures preferably have oxygen contents within the range of about 5% by volume to about 20% or more by volume. As such mixtures they may be employed air or air which has been diluted with a suitable inert gas such as nitrogen, $CO_2$ and the like, or corresponding mixtures prepared from substantially pure gaseous oxygen and such inert diluents may be used.

The oxidation reaction is effected at a temperature of from about 350° F. to about 425° F., and preferably at a temperature of from about 370° F. to 400° F. At lower reaction temperatures, the oxidation proceeds slowly, and the minimum temperature at which the reaction is conducted will be dictated by economic consideration including the degree of conversion desired within any desired period of time. At elevated temperatures, the rate of oxidation and the yield of desired product increase, but exceptionally high temperatures may result in non-selective oxidation of the feedstock to carbon dioxide and water. It will be realized that the optimum temperature within the indicated range will depend to a certain extent upon the oxidation catalyst and associated reaction conditions.

The process of the invention may be conducted at atmospheric or super-atmospheric pressure, the minimum pressure being dictated by the requirement that liquid phase reaction conditions be maintained at the particular temperature at which the oxidation is conducted. Depending upon the particular pyridine compound oxidized as well as the particular solvent employed, atmospheric pressure may be sufficient to insure that the reactants are substantially present in the liquid phase. Higher pressures may be employed, for example pressures from atmospheric up to about 1500 p.s.i.g. (pounds per square inch gauge). In the preferred mode of operation the pressure in the reaction vessel is adjusted so that at the operating temperature reflux conditions prevail in order that the refluxing solvent may aid in the dissipation of reaction heat.

The reaction time should be sufficient to obtain a desirable conversion of the substituted pyridine compound to the isonicotinic acid, for example in the range of from about 0.5 to 25 or more hours, preferably up to about 4 hours. It will be apparent to one skilled in the art that time and temperature are interrelated variables and that the time of reaction will depend upon the oxidation conditions as well as the degree of conversion which is desired.

The process of my invention may be carried out batchwise, intermittently or continuously. Where the process is carried out batchwise the reaction vessel comprises a suitable container having means for controlling temperature and pressure and provided with an inlet for introducing molecular oxygen-containing gas below the surface of the liquid reactants and an outlet for removing inert or unreacted gases and a condenser for removing entrained or volatilized liquids from the gaseous effluent. The formaldehyde condensation product of gamma picoline together with solvent if one is employed, and the desired amount of metallic oxidation catalyst are charged to the reactor. Oxygen, for example air, is passed through the reaction mixture which should be vigorously agitated, for example by means of the gaseous stream or additionally by means of a power driven stirrer in order to effect maximum contact of the oxygen with the oxidizable charge. The temperature is then raised gradually from ambient temperature to the operating range, for example up to about 370° F. while maintaining a pressure of from atmospheric to about 1500 p.s.i.g. in the reactor. Appreciable oxidation occurs accompanied by exothermic heat of reaction and the temperature is controlled to maintain the reaction within the desired temperature range. Unreacted oxygen and inert gases are continuously bled off to maintain the pressure within the desired limits and the progress of the oxidation reaction may be readily determined by the analysis of the off-gases for oxygen content. When the oxygen content of the off-gases indicates that little or no oxygen is being taken up by the reaction mixture, the reactor is cooled and the pressure released. The reactor contents are then further cooled to about room temperature and precipitated isonicotinic acid is separated by filtration and may then be further purified, for example by recrystallization. The mother liquors are distilled and the recovered pyridine compound may be recycled to the oxidation reaction. The residue obtained from the distillation may be further processed for recovery of additional quantities of isonicotinic acid.

In order to facilitate a clear understanding of the invention the following illustrative embodiment of the invention is described in detail.

*Example*

A mixture of 27 g. (0.9 mol) of paraformaldehyde and 84 g. (0.9 mol) of gamma picoline was heated in a sealed container at 135°–140° C. for 17 hours, giving 100 g. of colorless viscous 4-(beta-hydroxy ethyl) pyridine having a refractive index $n_D^{20}$ of 1.5280.

A mixture of 51 g. of this condensation product and 150 g. of glacial acetic was charged to a tubular reactor provided with gas inlet, overhead condenser, and means for heating. To this was added a solution of 0.2 g. cobalt acetate and 0.4 g. manganese acetate in 6 ml. of water, and the reaction mixture heated while introducing air beneath the surface at a rate of 0.13 cubic foot per minute. The pressure on the reactor was maintained at 400 p.s.i.g. Oxidation, as evidenced by reduction of the oxygen content of the exit gases, began at 370° F. The temperature was maintained at 370°–375° F. until 11.5 cubic feet of air measured at standard temperature and pressure had passed through the mixture (90 minutes). During this period the oxygen content of the exit gases fell from an initial value of 20.8% to 13.6% and finally returned to about 20%.

The reactor contents were then cooled and the mixture filtered at 15° C., giving 13 g. of isonicotinic acid melting at 310°–311° C. (sealed tube) and at 316° C. after crystallization from water.

The oxidation mother liquors were distilled giving 158 g. of distillate and 24 g. of residue from which additional quantities of isonicotinic acid could be recovered.

Although the foregoing example was conducted in a batchwise manner, it will be appreciated that a continuous method of operation may be employed, in which a portion of the reaction mixture is withdrawn from the reactor continuously or intermittently, isonicotinic acid is separated therefrom, and unconsumed pyridine compounds are returned, and fresh feed is supplied to the reactor in amount sufficient to maintain the desired concentration of oxidizable feedstock in the reactor. The ratio of the total oxygen feed into the reaction mixture relative to the pyridine compound may be varied over wide limits, and desirably a substantial excess of oxygen over that required to effect the desired conversion is utilized. The oxidation may be carried to substantial completion, that is, to the point at which no further oxygen is absorbed, or may be interrupted when any desired degree of conversion is achieved. The desired product can be recovered from the reaction mixture by any suitable method, for example by filtration from the reaction product. If desired, the pyridine carboxylic acid may be recovered from the reaction mixture by extraction with an aqueous solution of an alkali and acidification of the extract to regenerate the acid from its salt. Other methods of recovery include selective solvent extraction, conversion to insoluble derivatives such as the copper salt, and like methods.

Having described my invention, what I claim is:

1. A process of preparing isonicotinic acid from a methylolated derivative of gamma picoline having at least one methylol group attached to the carbon atom of the gamma methyl group which comprises oxidizing said methylolated derivative in the liquid phase with molecular oxygen in the presence of a solvent comprising a monocarboxylic acid having from 2 to 8 carbon atoms in the molecule and in the presence of from about 0.001% to about 5% by weight of a metallic oxidation catalyst comprising essentially as the sole effective catalytic ingredient thereof a heavy metal salt of a carboxylic acid at a temperature of from about 350° F. to about 425° F. and at a pressure at least sufficient to maintain liquid phase reaction conditions.

2. The process of claim 1 wherein the oxidation is effected in the presence of a solvent comprising a saturated aliphatic mono-carboxylic acid having from 2 to 8 carbon atoms in the molecule.

3. The process of claim 2 wherein a ratio of about 0.5 to about 10 parts by weight of acetic acid is utilized per part of gamma picoline derivative.

4. The process of claim 2 wherein the catalyst is selected from the group consisting of cobalt salts, manganese salts and mixtures thereof.

5. A process for preparing isonicotinic acid which comprises oxidizing 4-(beta-hydroxy ethyl) pyridine with molecular oxygen in the liquid phase in the presence of from about 0.5 to about 10 parts by weight of a solvent comprising a lower saturated aliphatic mono-carboxylic acid having from 2 to 8 carbon atoms in the molecule and in the presence of from about 0.01 to about 2% by weight of a metallic salt oxidation catalyst comprising essentially as the sole effective catalytic ingredient thereof a heavy metal salt of a carboxylic acid at a temperature of from about 350° F. to about 425° F. and at a pressure from atmospheric to about 1500 p.s.i.g.

6. The process of claim 5 wherein acetic acid is utilized as the solvent.

7. The process of claim 6 wherein the catalyst is a mixture of cobalt and manganese salts.

References Cited in the file of this patent

UNITED STATES PATENTS

| | | |
|---|---|---|
| 2,245,528 | Loder | June 10, 1941 |
| 2,437,938 | Cislak et al. | Mar. 16, 1948 |
| 2,748,138 | Barker et al. | May 29, 1956 |
| 2,833,778 | Saffer et al. | May 6, 1958 |